April 14, 1970   R. C. HANSON ET AL   3,506,037
LIQUID PROPELLANT EXPULSION CONTROL MECHANISM
Filed May 15, 1968   2 Sheets-Sheet 1

INVENTORS
RODDNEY C. HANSON
CLYDE E. TEAGUE
MYRON G. URDEA
BY
Arsen Tashjian
ATTORNEY

United States Patent Office 3,506,037
Patented Apr. 14, 1970

3,506,037
LIQUID PROPELLANT EXPULSION CONTROL MECHANISM
Roddney C. Hanson, Azusa, Clyde E. Teague, Placerville, and Myron G. Urdea, Costa Mesa, Calif., assignors to the United States of America as represented by the Secretary of the Air Force
Filed May 15, 1968, Ser. No. 729,155
Int. Cl. F16l 55/04
U.S. Cl. 138—30                          1 Claim

ABSTRACT OF THE DISCLOSURE

A self-adjusting locking mechanism, in combination with a circular metal band, for positioning within a flexible bladder inside a pressure vessel to prevent undesirable folding during repetitive changes in configuration of the bladder. The locking mechanism is fitted between, and connected to, the cut ends of the band. The locking mechanism includes a cylindrical helical spring with loop ends. Each loop end is hooked to a retention clip, one of which is connected to one end of the cut band, and the other is connected to a sleeve which, in turn, is connected to the other end of the cut band. The locking mechanism allows the metal band to expand or contract to conform to the bladder configuration, irrespective of the attitude of the pressure vessel.

BACKGROUND OF THE INVENTION

This invention relates to the art of pressure vessels of the bladder type and, more particularly, to an apparatus for repetitively changing the configuration of the bladder thereof.

The conventional pressure vessel of the type mentioned comprises a rigid container and a flexible and deformable bladder within said container. The bladder is filled with a fluid and the container is also filled with a fluid. The bladder acts as a movable but impervious partition between the fluids.

In the pressure vessel of the specific types to be discussed herein, the bladder is filled with a liquid, the container is filled with gas under pressure, and the liquid in the bladder is expelled by changes in pressure of the gas in the container.

The basic, and as yet still unsolved, problem in connection with pressure vessels of this type is to prevent deflation of the bladder into irregular shapes, which result in sharp folds and premature failure of the bladder.

In the prior art many attempts have been made to correct, or to minimize, this problem. These attempts have included, but have not been limited to, the following: (a) a standpipe has been used wholly within the bladder to prevent collapse of the bladder; (b) the bladder has been in an inverted position within the container so that it will hang, rather than fold, when not substantially full of fluid; (c) the bladder has been reinforced, in whole or in part, to minimize premature rupture due to sharp folds; and (d) secondary bladders, internal to and wholly within the primary bladder, also have been used. These attempts, although advancements over the prior art, have not eliminated the basic problem. For example: In pressure vessels of the inverted bladder type, a change in attitude of the container, such as a rotation of 180°, will cause a collapse of the bladder, with resultant undesirable sharp folds.

SUMMARY OF THE INVENTION

This invention provides for an apparatus which allows repetitive changes in configuration of a flexible bladder in a container of the pressure vessel type, without causing sharp folds in the deflated bladder and resultant premature failure.

Therefore, an object of this invention is to prevent sharp folds in a bladder of the type used in pressure vessels.

Another object of this invention is to provide an apparatus which permits repetitive changes in configuration of bladder in a pressure vessel, without premature failure of the bladder.

A further object of this invention is to provide a highly reliable, and yet very economical, apparatus for the positive expelling of fluid from the bladder member of the pressure vessel.

A still further object is to permit the use of a pressure vessel of the bladder type in any attitude, without causing sharp folds in the bladder when deflated and without loss of efficiency of the bladder.

These, and still other, objects of our invention will become readily apparent after a consideration of the description of our invention and of the drawings.

DESCRIPTION OF THE PREFERRED EMBODIMENT

Figure 1:
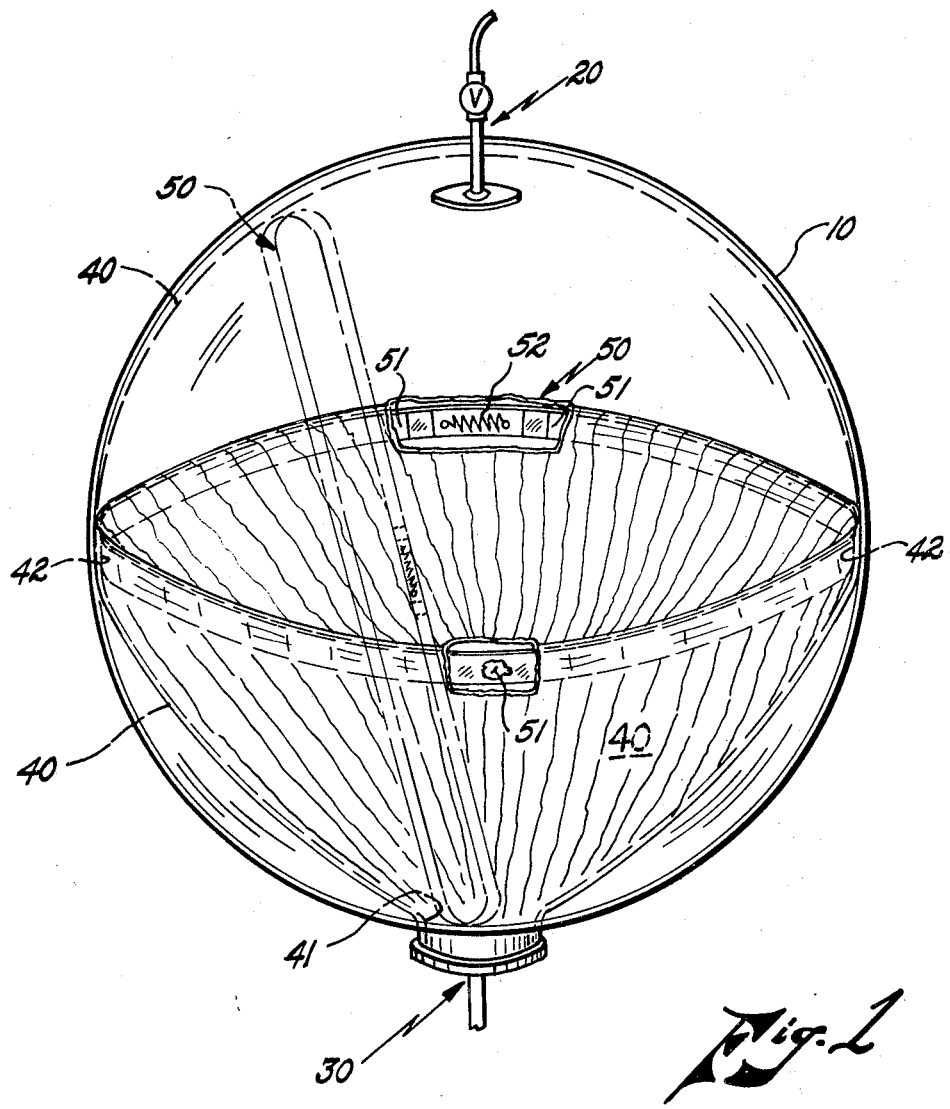
FIGURE 1 is a perspective view, partially fragmentary, of a pressure vessel of the bladder type, showing the bladder in a deflated condition and also showing the manner of insertion and the final relative position of a preferred embodiment of our invention.

With reference to FIGURE 1, the pressure vessel includes container 10, with gas port assembly 20, liquid port assembly 30, and bladder 40.

Container members of pressure vessels must be rigid, strong enough to withstand high pressure, and may be spherical, cylindro-spherical or cylindrical in configuration. Further, they may be transparent, translucent or opaque, as needed or desired. Container 10 is of a conventional type and, specifically, is rigid, made of strong transparent material, and is spherical.

Gas port assembly 20 and liquid port assembly 30 are also conventional. They are longitudinally aligned, i.e. axially opposed, and are controlled in any suitable manner. Gas port 20 is of the spring urged poppet valve member type which closes when bladder 40 is inflated and presses against it. The port of port assembly 30 is sufficiently large in diameter, i.e. approximately six inches, to permit an individual to place his hand and arm through said port. Shown in phantom in FIGURE 1 is the initial inserted position of the self-adjusting locking mechanism assembly 50 which is then rotated to its final horizontal position.

Bladder 40 is also conventional in the art. It is of resilient material and is collapsible or expansible. It has a circular peripheral edge 42 and, at one end, a mouth 41 with annular bead (not shown), by which it is secured to liquid port assembly 30. Bladder 40 intervenes between the port members of port assemblies 20 and 30 and, thereby defines a chamber, both internal to itself and externally between the exterior of bladder 40 and the inner surface of container 10.

It is to be noted that container 10, gas port assembly 20, liquid port assembly 30, and bladder 40 are not, per se, novel and do not individually or in combination form a part of our invention.

Figure 2:
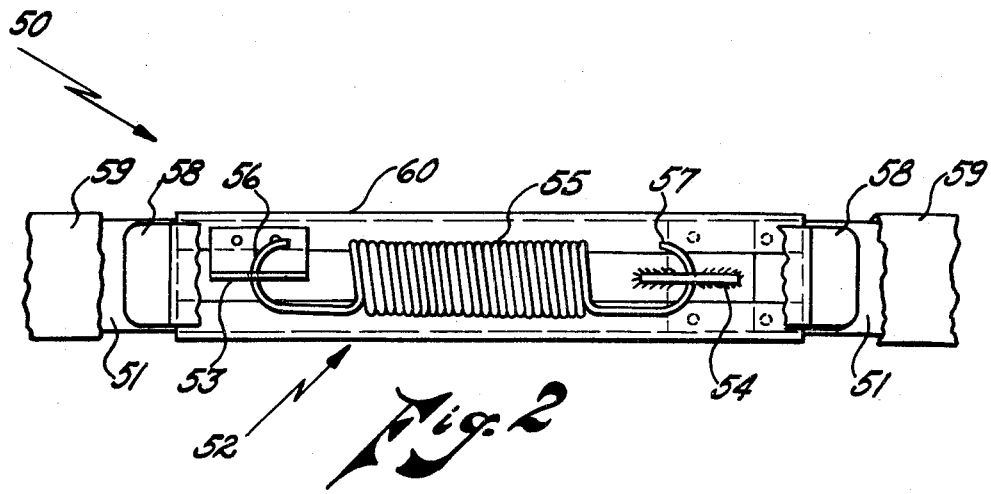
FIGURE 2 is an enlarged front elevation view of the self-adjusting locking mechanism according to our invention shown in FIGURE 2.
Figure 3:
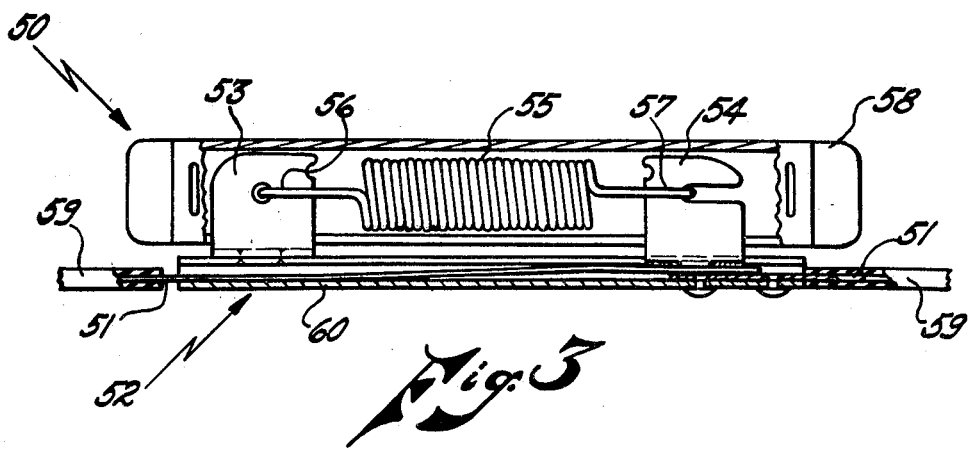
FIGURE 3 is an enlarged top view, partially in cross-section of the self-adjusting locking mechanism according to our invention shown in FIGURE 1.

In contradistinction, and with reference to FIGURES 1, 2 and 3, our invention is directed toward a self-adjusting locking mechanism assembly 50 which comprises, in combination, a metal band 51 and a self-adjusting locking mechanism 52, which are used internal to bladder 40.

The circumference of self-adjusting locking mechanism assembly 50 is equal to the periphery of the inner surface of the circular edge 42 of bladder 40.

Metal band 51 is rectilinear in cross-section and is substantially wider than it is thick and is covered, from one end to the other, but exclusive of the front of self-adjusting locking mechanism 52, with a plastic, or similar, covering or sheathing 59, of smooth, non-abrasive material, to prevent cutting into, or otherwise abrading, bladder 40.

With reference to FIGURE 3, self-adjusting locking mechanism 52 includes retaining clips 53 and 54, cylindrical helical spring 55 with loops 56 and 57, and locking mechanism cover 58. Retaining clip 54 is affixed to one end of metal band 51. Retaining clip 53 is affixed to a sleeve 60 which, in turn, is affixed to the other end of metal band 51. Loop 56 of cylindrical helical spring 55 is hooked to retaining clip 53 and loop 57 is hooked over retaining clip 54. Sleeve 60 has a slit (not shown) which serves as a guide and permits retaining clip 57 and metal band 51 to move back and forth, as a result of the inflation or deflation of bladder 40. As finally positioned, self-adjusting locking mechanism 52 with cover 58 are facing toward the center of bladder 40.

It is to be noted that a seal is intentionally not achieved at the mating periphery between the outer surface of bladder 40 at circular edge 42 and the inner surface of container 10. This gap allows the pressurizing gas, which is to be used in the chamber defined by the outer surface of bladder 40 and the inner surface of container 10, to pass through. As a result, bladder 40 is rendered self-aligning during fill or collapse, independent of attitude of the pressure vessel. In addition, because of this lack of seal, the pressurizing gas can get to the lower half of container 10 and above liquid port assembly 30 and, thereby, effect maximum expulsion of the liquid in bladder 40.

With gas port assembly 20 in position and connected to a pressurized gas source, and with liquid port assembly 30 also in position and connected to a liquid source, the pressure vessel is ready for use in a conventional manner.

What is not conventional, and could not be expected to be reached by the normal state-of-the-art approach, is that the pressure vessel may be used in a conventional manner, irrespective of the attitude of the pressure vessel. Even if the pressure vessel shown in FIGURE 1 were to be rotated 180°, the pressure vessel would still be operative and efficiently so.

As is obvious from FIGURE 1, when the pressure vessel is in the upright position shown, and then is expulsion of liquid from bladder 40 with resultant deflation of said bladder 40, bladder 40 merely folds softly over self-adjusting locking mechanism assembly 50 and into the void or cavity formed by the expulsion of liquid from bladder 40. The formation of sharp folds, with risk of tear of the bladder and premature failure, is thereby obviated.

While there has been shown and described the fundamental features of the invention, as applied to the preferred embodiment, it is understood that various substitutions and omissions may be made by those skilled in the art without departing from the spirit of the invention. For example: (a) the configuration of container 10 and bladder 40 need not be the configuration shown in FIGURE 1; (b) band 51 need not be of metal; and (c) container 10 may hold a liquid, rather than a gas, and conversely bladder 40 may hold a gas, rather than a liquid.

What is claimed is:

1. An apparatus for preventing the formation of undesirable folds during the repetitive changes in configuration of a bladder of the type used in pressure vessels, comprising:
   (a) a metal band, rectilinear in cross-section, and substantially wider than it is thick, with said metal band cut across its entire width;
   (b) a sleeve, substantially wider than it is thick, with internal periphery equal to, and configurated similar to, the external periphery of said metal band, said sleeve having a slit along the entire length of one surface of its width, with one end of said sleeve fitted over and affixed to one end of said metal band;
   (c) a locking mechanism having a cover and including a retaining clip affixed to the other end of said metal band, another retaining clip affixed to an edge of the slit portion of said sleeve, a cylindrical helical spring with loops, with said cylindrical helical spring disposed between said retaining clips, one loop of said cylindrical helical spring hooked to one of said retaining clips and the other loop of said cylindrical helical spring hooked to the other retaining clip, thereby holding said cylindrical helical spring in place and rendering said mechanism self-adjusting to the configuration of said bladder; and
   (d) a sheathing of smooth, non-abrasive material, covering said metal band, to prevent cutting into said bladder.

References Cited

UNITED STATES PATENTS

| 2,192,548 | 3/1940 | Gunderson | 138—30 X |
| 2,380,866 | 7/1945 | Overheke | 138—30 |
| 2,492,014 | 12/1949 | Spalding | 138—30 X |
| 3,364,949 | 1/1968 | Sugimura | 138—30 |

FOREIGN PATENTS

| 180,952 | 2/1955 | Austria. |

HERBERT F. ROSS, Primary Examiner